US005391947A

United States Patent [19]

[11] Patent Number: 5,391,947
[45] Date of Patent: Feb. 21, 1995

Groves, Jr. et al.

[54] VOLTAGE RATIO TO CURRENT CIRCUIT

[75] Inventors: James O. Groves, Jr., Endicott; Jonathan J. Hurd, Vestal; Stephen F. Newton, Endicott, all of N.Y.

[73] Assignee: International Business Machines Corporation, Armonk, N.Y.

[21] Appl. No.: 169,568

[22] Filed: Dec. 17, 1993

Related U.S. Application Data

[63] Continuation of Ser. No. 927,908, Aug. 10, 1992, abandoned.

[51] Int. Cl.⁶ ......................... G06G 7/00; G06G 7/24; G06G 7/16; G06F 7/556

[52] U.S. Cl. ................................... 327/346; 327/360; 327/355; 327/103

[58] Field of Search ............... 307/490, 492, 498, 529; 328/145, 161

[56] References Cited

U.S. PATENT DOCUMENTS

| | | | |
|---|---|---|---|
| 3,686,513 | 8/1972 | Miller | 328/161 |
| 4,039,868 | 8/1977 | Aono et al. | 328/161 |
| 4,458,329 | 7/1984 | Remy | 307/529 |
| 4,482,977 | 11/1984 | Ross | 307/529 |
| 4,876,499 | 10/1989 | Anderson et al. | 328/145 |
| 4,937,516 | 6/1990 | Sempel | 307/529 |
| 5,065,053 | 11/1991 | Chan et al. | 328/145 |

*Primary Examiner*—Willis R. Wolfe
*Attorney, Agent, or Firm*—Arthur J. Samodovitz; William H. Steinberg

[57] ABSTRACT

A circuit for providing an output current proportional to a first voltage raised to a fractional exponential power divided by a second voltage raised to a fractional exponential power, is supplied. The circuit has four strings of series connected pn junctions. The first and second voltages are connected to the first and fourth string, respectively. A reference current is provided to the second string, while the third string provides the output current. The number of pn junctions are chosen to give the desired fractional exponents of the two voltages while the number of pn junctions in the third string is selected to adjust for the number of pn junctions in the other strings.

16 Claims, 2 Drawing Sheets

VOLTAGE RATIO TO CURRENT CIRCUIT

This is a continuation of application(s) Ser. No. 07/927,908, filed on Aug. 10, 1992, now abandoned.

CROSS-REFERENCE TO RELATED APPLICATIONS

The present application is related to co-pending applications:

1. Ser. No. 07/927,572 entitled "ON TIME CONTROL AND GAIN CIRCUIT", now U.S. Pat. No. 5,264,780
2. Ser. No. 07/927,908 entitled "DROPOUT RECOVERY CIRCUIT", now abandoned
3. Ser. No. 07/927,590 entitled "CRITICALLY CONTINUOUS BOOST CONVERTER", still pending.

BACKGROUND OF THE INVENTION

The present invention relates to analog circuitry used to determine the ratio of two voltages raised to fractional powers.

Analog circuits that determine mathematical relationships find many uses in control systems used in manufacturing process control and feedback control of power processing equipment. In regulated power supplies, for example, the output voltage is compared to a reference to generate an error voltage proportional to the difference of these voltage levels. Sometimes the voltage levels of several outputs are summed to provide proportional control of all outputs. The error voltage is frequently integrated or differentiated to get improved transient response and loop stability. In other cases it may be necessary to raise error voltage to a fractional power to compensate for gain characteristics of another element in the feedback loop, or to divide the error voltage to a fractional power to compensate for gain variation due to input voltage or load current changes.

Simple mathematical functions are usually calculated with operational amplifiers and associated circuitry. Addition and subtraction can be achieved in a straightforward manner with the use of resistors, while integration and differentiation require capacitors or inductors. More complicated functions involving products or ratios are found by taking logarithms through use of the properties of a forward biased junction, adding or subtracting the result, and finally taking the antilogarithm.

Calculation of complex-expressions using operational amplifiers can require a very large number of components, adding substantially to the size and cost of the control circuit. In some instances simpler circuitry can be used to perform specialized calculations with reduced size and cost.

An object of the present invention is to provide a compact circuit that can provide the ratio of two voltages each raised to a preselected fractional power.

Another object of the present invention is to provide an output current which is representative of the ratio of two voltages each raised to a preselected fractional power.

SUMMARY OF THE INVENTION

In one aspect of the present invention, a circuit for providing an output current proportional to a first voltage raised to a fractional exponential power divided by a second voltage raised to a fractional exponential power is supplied. The circuit has a first resistor connected in series with the first voltage. A first string of one or more series connected pn junctions, is connected in series with the first resistor. A second string of series connected pn junctions, having at least one pn junction, is connected between first and second current sources. The first string of pn junctions is connected in parallel with the second current source. The first and second current sources provide currents of substantially equal value. A third string of series connected pn junctions which includes an output transistor for providing the output current. The base of the output transistor is connected to the junction of the first current source and the second string. The third string includes the output transistor alone or in combination with at least one pn junction connected in series with the output transistor. A third current source is connected in series with the third string. The third current source provides a current substantially equal to the current flowing in the output transistor. A second resistor is connected in series with the second voltage. A fourth string of series connected pn junctions, having at least one pn junction, is connected at one end to the second resistor and at the other end to the end of the first string. The third current source and the fourth string are connected in parallel with one another. The number of series connected pn junctions in the first, third, and fourth string determine the desired fractional exponential powers.

DETAILED DESCRIPTION OF THE INVENTION

Figure 1:
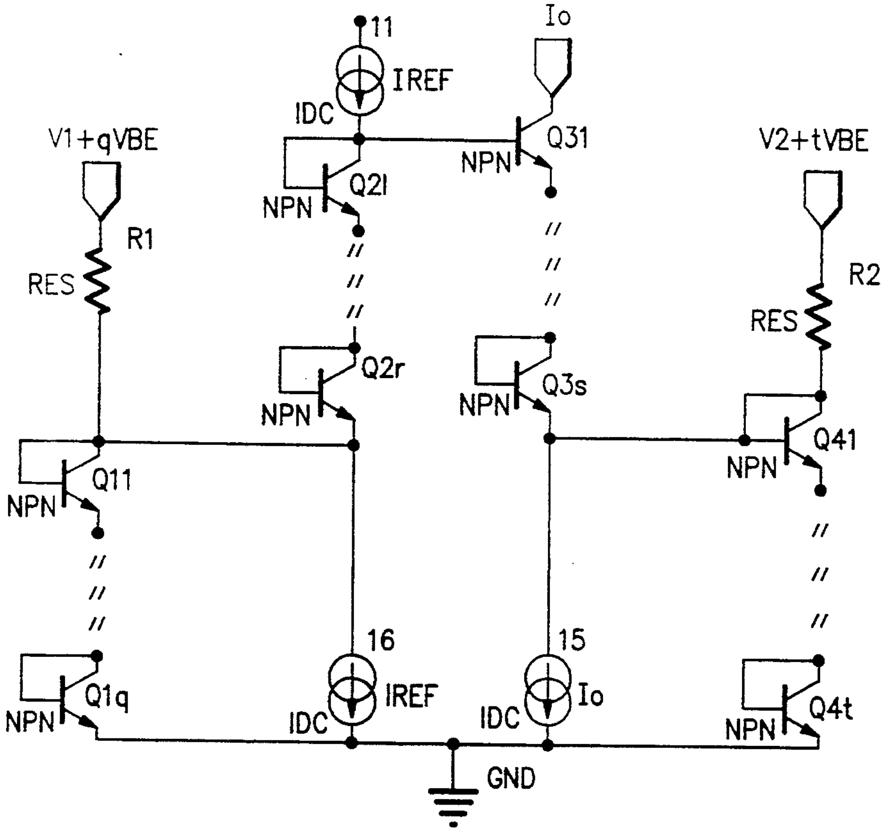
FIG. 1 is a simplified schematic of a circuit for providing an output current proportional to the ratio of two voltages each raised to a fractional power in accordance with the present invention.

In the simplified schematic, a first voltage V1+qVBE, where VBE is the base-to-emitter voltage drop of a bipolar transistor, and q is a number discussed hereinafter, is connected through a resistor R1 to a series circuit or "string" of one or more diodes, shown in FIG. 1 as q series connected npn transistors Q11–Q1*q*, each having its base and collector connected. The transistors each with their base and collector connected provide a pn junction from the base to the emitter of the transistor. Resistor R1 is connected to the collector of transistor Q11. The emitter of transistor Q11 is connected to the collector of the next transistor in the string. The emitter of the last transistor in the string Q11 is connected to ground. A first current source Iref is connected to another string 13 of one or more diodes, shown in FIG. 1 as r series connected npn transistors Q21–Q2*r*, each having its base and collector connected. The collector of the first transistor of the second string Q21 is connected to the first current source, and the emitter is connected to the collector of the next transistor of the second string. The emitter of the last transistor in the string Q2*r* is connected to a second current source Iref which in turn is connected to ground. The collector of transistor Q11 is connected to the emitter of transistor Q2*r*. Output current Io is connected to the collector of npn transistor Q31. The collector of transistor Q21 is connected to the base of transistor Q31. The emitter of transistor Q31 is connected to the collector of the first of any series connected npn transistors Q32, and if none then to a current source Io. Transistor Q32 is not shown but is the transistor connected in series with transistor Q31 when there is more than one transistor in the third string. Current source Io provides a current equal to the current in the collector of transistor Q31. Transistors Q32-Q3*s* each have their base connected to their collectors. The emitter of transistor Q3*s* is connected to current source Io which in turn is connected to ground. A voltage V2+tVBE is connected through a resistor R2 to a fourth string of one or more series connected npn transistors Q41–Q4*t* each having its base and collector connected. The emitter of transistor Q3*s* is connected to the base of transistor Q41 and the emitter of transistor Q4*t* is connected to ground.

Operation of the simplified schematic is as follows. The current in transistors Q11 through Q1*q* is equal to V1/R1 so the voltage across the transistor string Q11–Q1*q* is proportional to q(ln(V1/R1)) according to the Ebers-Moll equation. The current flowing into the first transistor string 11 from transistor Q2*r* is balanced by current flowing into the second current source Iref, which is in parallel with the first transistor string, and therefore the voltage drop across transistor string Q11–Q1*q* is not affected. The current Iref flows in transistor string Q21–Q2*r*, so the voltage across these devices is proportional to r(ln(Iref)). The voltage at the base of Q31 is therefore proportional to q(ln(V1/R1))+r(ln(Iref)). Current in transistor string Q41-Q4*t* is equal to V2/R2, so that the voltage is proportional to t(ln(V2/R2)). Current flowing into the base of transistor Q41 from transistor Q3*s* is balanced by current flowing into current source Io in parallel with transistor string Q41–Q4*t* so that the voltage in transistor string Q41–Q4*t* string is not affected. The voltage from the base of Q31 to the emitter of Q3*s* is proportional to q(ln(V1/R1))+r(ln(Iref))−t(ln(V2/R2)). The number of VBE drops at the base of Q31 must be the same through the first and second strings as through the third and fourth strings for the circuit to function correctly, so q+r=s+t. Since q, s, and t are chosen to give the desired mathematical function, r must be selected to make the total number of VBE drops equal, so r=s+t−q.

With r=s+t−q, the current in the collector of Q31 is given by $Io=Iref^{((S+t-q)/s)}\ (V1/R1)^{(q/s)}/V2/R2)^{(t/s)}$.

For example, if q=s=t=1, the output current is simply proportional to the ratio of the input voltages. If s=t=2 and q=1, the output current is proportional to the ratio of the square root of a first voltage divided by a second voltage. This circuit is shown in FIGS. 2 and 3.

Figure 2:
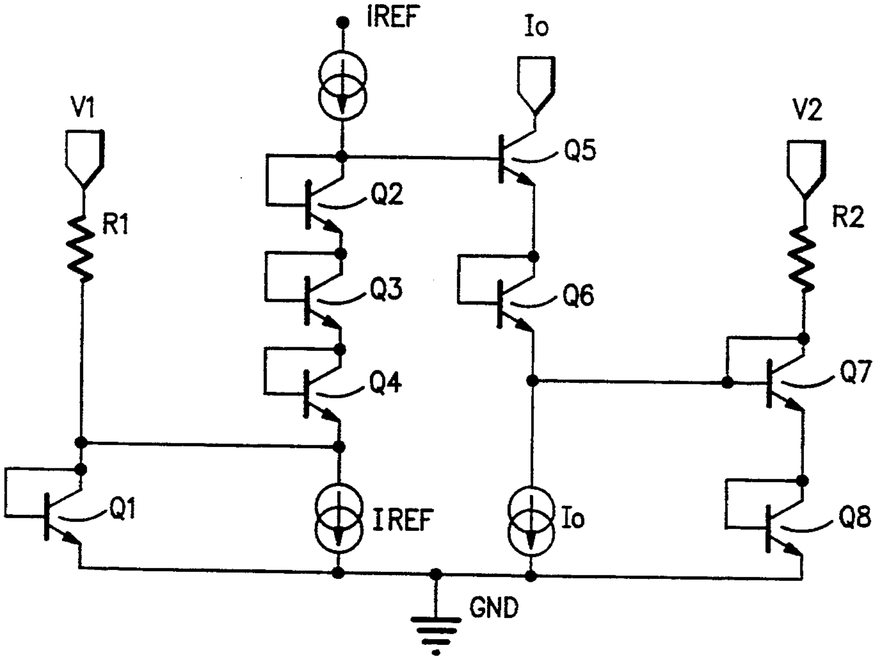
FIG. 2 is simplified schematic of a circuit for providing an output current proportional to the square root of a first voltage divided by a second voltage in accordance with the present invention.

Referring now to FIG. 2, a simplified schematic circuit diagram of a circuit which provides a current proportional to the ratio of the square root of a first input voltage divided by a second input voltage. In the simplified schematic, a first voltage V1 is connected through a resistor R1 to the base and collector of an npn transistor Q1. The emitter of transistor Q1 is connected to ground. A first current source Iref is connected to three npn transistors Q2, Q3, and Q4 which are connected in series with one another. Each of the transistors Q2, Q3, and Q4 has its base connected to its collector, with the collector of Q2 connected to the first current source, and the emitter of transistor Q2 connected to the collector of transistor Q3. The emitter of transistor Q3 is connected to the collector of transistor Q4. The emitter of transistor Q4 is connected to a second current source Iref which in turn is connected to ground. The collector of the first transistor Q1 of the first string is connected to the emitter of the last transistor Q4 of the second string. Output current Io is provided by the collector of npn transistor Q5. The collector of transistor Q2 is connected to the base of transistor Q5. The emitter of transistor Q5 is connected to the collector of npn transistor Q6. The base of transistor Q6 is connected to its collector. The emitter of transistor Q6 is connected to a current source Io which in turn is connected to ground. A voltage V2 is connected through a resistor R2 to the collector of an npn transistor Q7. Transistor Q7 is in series with an npn transistor Q8. The base and collector of transistor Q7 are connected to one another. The base and collector of transistor Q8 are also connected to one another. The emitter of transistor Q6 is connected the base of transistor Q7 and the emitter of transistor Q8 is connected to ground.

Figure 3:
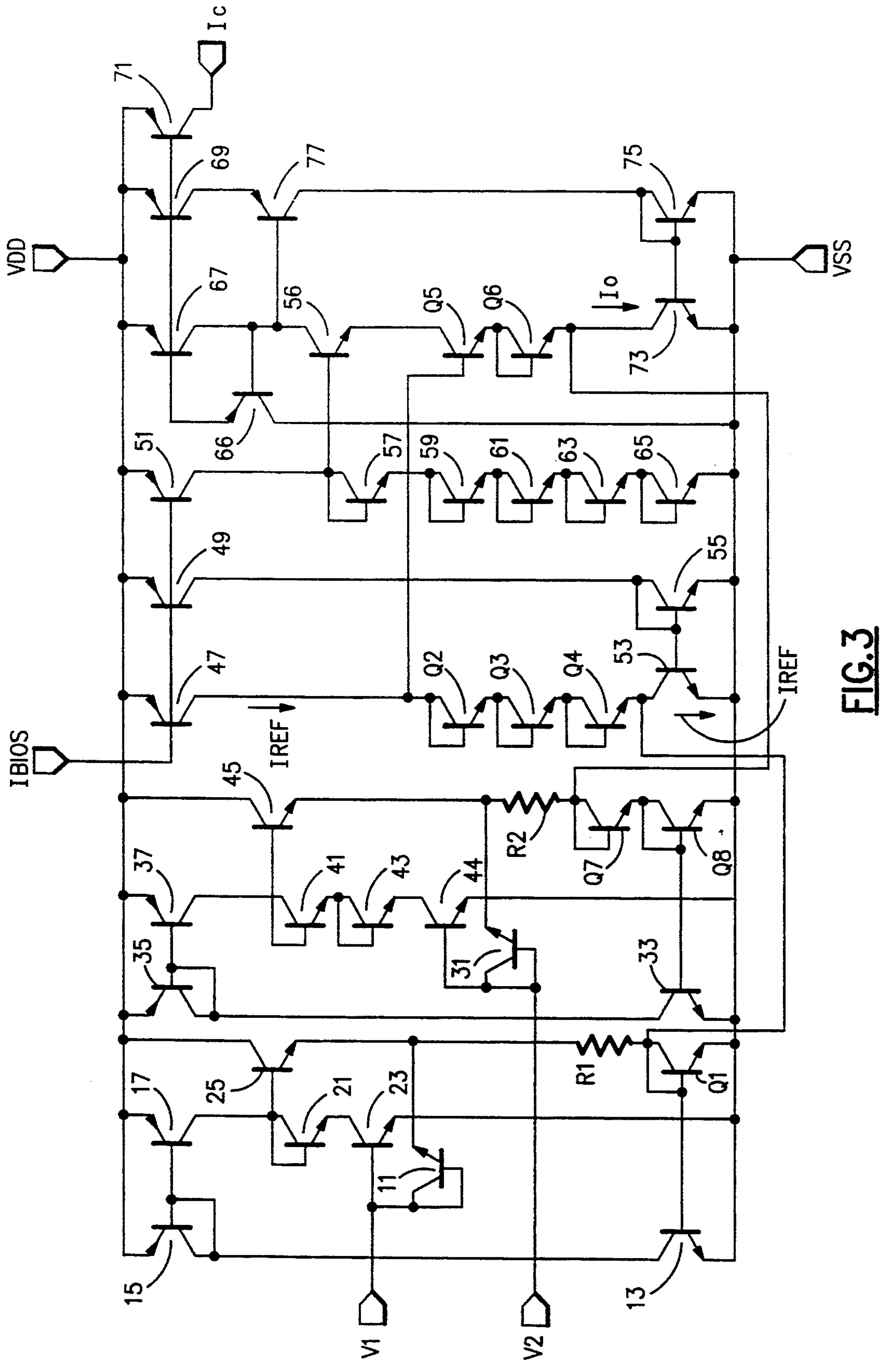
FIG. 3 is a more detailed implementation of the circuit of FIG. 2.

A more detailed implementation of the circuit of FIG. 2 is shown in FIG. 3. Voltage V1 is connected to resistor R1 through a diode connected npn transistor 11. Diode connected transistor Q1 is in series with resistor R1 and the emitter of transistor Q1 is connected to ground. The base of npn transistor 13 is connected to the base of transistor Q1 and the emitter of transistor 13 is connected to the emitter of Q1. Transistor 13 mirrors the current in transistor Q1 and provides the mirrored current to a current mirror comprising pnp transistors 15 and 17. Transistor 15 and 17 have their emitters connected together and to a supply voltage. The base and collector of transistor 15 are connected to one another and to the collector of transistor 13. The current flowing through transistor 17 mirrors the current in transistor 15 and is provided to a diode connected npn transistor 21 which is in series with an pnp transistor 23 which has its collector connected to ground. The collectors of transistor 17 and 21 are connected together. The emitters of transistors 21 and 23 are connected together. The base of transistor 23 is connected to V1. An npn transistor 25 is in series with resistor R1, with the collector of transistor 25 connected to the emitter of transistor 17. The current through transistor 25 is controlled by the 2 VBE drop across transistors 21 and 23 and provides a current in transistor 25 sufficient to make up for the voltage drop that occurs across transistors 11 and Q1, so that V1 appears across R1 undiminished.

Similarly, the voltage drop that occurs across transistor 31 and transistors Q7 and Q8 is compensated for by the current provided by npn transistor 45 which has its emitter connected to resistor R2 and its collector connected to the collector of transistor 25. Resistor R2 is in series with transistors Q7 and Q8. The base of transistor 45 is controlled by the voltage drop across series connected transistors 41, 43, 44 when the current through Q7 and Q8 is provided thereto by a current mirror comprising npn transistors Q8 and 33, and a current mirror comprising pnp transistors 35 and 37. Current mirrors with pnp transistors source current while current mirrors with npn transistors sink current. Transistor 41 is an npn type while transistors 43 and 44 are pnp types. The base and collector of transistor 41 are connected to each other as is the base and collector of transistor 43. The collector of transistor 41 is connected to the collector of transistor 37 and to the base of transistor 45. The emitters of transistor 41 and 43 are connected to one another. The collector of transistor 44 is connected to the emitter of transistor Q8. Voltage V2 is connected to the base of transistor 44. The bases and emitters of transistors 33 and Q8 are connected to one another. The base and collector of transistor 35 are connected to one another and to the collector of transistor 33 and to the base of transistor 37.

A bias current provided to the base of pnp transistors 47, 49, and 51 which each have their emitters connected to one another and to supply Voltage each provide a current Iref which is determined by the common bias current. Iref is supplied to series connected transistors Q2, Q3, and Q4. A current mirror comprising npn transistors 53 and 55, has transistor 53 in series with transistor Q4. Transistor 55 sets the current in the current mirror and the base of transistor 55 is connected to its collector, to the collector of transistor 49, and to the base of transistor 53. The emitter of transistors 53 and 55 are connected together and to a common voltage Vss. Therefore, transistor 53 carries Iref. To achieve a diode drop across transistors Q5, Q6, Q7, and Q8 to avoid the Early effect, transistor 56 which is in series with Q5 and Q6 provides sufficient current for the five VBE drops across transistors Q5, Q6, Q7, Q8, and 31. The base voltage of transistor 57 is controlled by the voltage drop across series connected npn transistors 57, 59, 61, 63, and 65, each of which has its collector connected to its base and carries the current Iref since the transistors are in series with transistor 51. The output current is supplied by a current mirror which supplies current to two loads comprising pnp transistors 66, 67, 69, 71, with the current in transistor 67 controlling the current in transistors 69 and 71. A current mirror comprising npn transistors 73 and 75, with the current in transistor 75 controlling the current flowing in transistor 73, provides the current Io in series between Q6 and ground. Transistor 77 eliminates the Early voltage effect in transistor 69. Transistor 71 of the current mirror provides the output Io of the circuit which represents a current proportional to the ratio of the square root of a first voltage V1 divided by a second voltage V2.

The foregoing has described a circuit for providing a current proportional to the ratio of two voltages, each of which is raised to a preselected fractional exponential power.

While the invention has been particularly shown and described with reference to a preferred embodiment thereof, it will be understood by those skilled in the art that various changes in the form and details may be made therein without departing from the spirit and scope of the invention.

We claim:

1. A circuit for providing an output current proportional to a first voltage raised to a fractional exponential power divided by a second voltage raised to a fractional exponential power comprising:

a first, second, third, and fourth string each of said strings having one or more series connected pn junctions, each of said strings coupled to one another;

means for connecting the first and second voltages in series with said first and fourth strings, respectively; and means for providing a reference current to said second string, said third string providing an output current proportional to the first voltage raised to a fractional exponential power divided by the second voltage raised to a fractional exponential power, said number of pn junctions being selected to give the desired fractional exponents of the two voltages.

2. A circuit for providing an output current proportional to a first voltage raised to a fractional exponential power divided by a second voltage raised to a fractional exponential power, comprising:

a first resistor;

means for applying the first voltage to one end of said first resistor;

a first string of one or more series connected pn junctions said first string connected in series with the other end of said first resistor;

a first and second current source for providing currents of substantially equal value;

a second string of one or more series connected pn junctions said second string connected between said first and second current sources, said first string of pn junctions connected in parallel with said second current source;

a third string of series connected pn junctions including an output transistor providing the output current;

a second resistor connected in series with said second voltage; and a fourth string of one or more series connected pn junctions, said fourth string being connected at one end to the second resistor and at the other end to the end of said first string, said third current source and said fourth string being connected in parallel with one another, whereby the number of series connected pn junctions in the first, third, and fourth string determine the desired fractional exponential powers.

3. The circuit of claim 2 wherein in said third string, the base of said output transistor being connected to the junction of said first current source and said second string, said third string comprising said output transistor alone or in combination with at least one pn junction connected in series with said output transistor.

4. The circuit of claim 3 wherein the number of series connected pn junctions in the second string is equal to the sum of series connected pn junctions in the third and fourth strings, less the number of pn junctions in the first string, where the output transistor is counted as one pn junction in the third string.

5. The circuit of claim 3 further comprising a third current source connected in series with said third string, said third current source providing a current substantially equal to the current flow in the output transistor.

6. The circuit of claim 5 wherein the first voltage is increased by an amount equal to the voltage drop across the first string and the second voltage is increased by an amount equal to the voltage drop across the fourth string.

7. The circuit of claim 5 wherein the number of series connected pn junction in the second string is equal to the sum of series connected pn junctions in the third and fourth strings, less the number of pn junctions in the first string, where the output transistor is connected as one pn junction in the third string.

8. The circuit of claim 7 wherein said first string includes one pn junction in the first string, three pn junctions in the second string, the output transistor and one pn junction in the third string, and two pn junctions in the fourth string, so that the output current is proportional to the square root of the first voltage divided by the second voltage.

9. A circuit for providing an output current proportional to a first voltage raised to a fractional exponential power divided by a second voltage raised to a different fractional exponential power, comprising:

a first resistor;

means for applying the first voltage to one end of said first resistor;

a first string of one or more series connected transistors, said first string connected at one end in series with said first resistor;

a first and second current source for providing currents of substantially equal value;

a second string of one or more series connected transistors, said second string connected between said first and second current sources, said first string connected in parallel with said second current source;

a third string of one or more series connected transistors including an output transistor providing the output current, said third string comprising said output transistor alone or in combination with one or more third string transistors;

a second resistor connected in series with said second voltage;

a fourth string of one or more series connected transistors said fourth string transistors having at least one diode connected transistor, said fourth current string being connected at one end to the second resistor and at the other end to the other end of said first string, whereby the number of transistors in the first, third, and fourth strings determine the desired fractional exponential powers.

10. The circuit of claim 9 wherein the first voltage is increased by an amount equal to the voltage drop across the first string and the second voltage is increased by and amount equal to the voltage drop across the fourth string.

11. The circuit of claim 9 wherein the umber of transistor in the second string is equal to the number of transistor in the third and fourth strings, less the number of transistors in the first string.

12. The circuit of claim 11 wherein said first string includes one diode connected transistor in the first string, three diode connected transistors in the second string, the output transistor and one series diode connected transistor in the third string, and two diode connected transistors in the fourth string, so that the output current is proportional to the square root of the first voltage divided by the second voltage.

13. The circuit of claim 9 wherein the transistors of the first second and fourth strings are diode connected transistors and any transistor in addition to the output transistor in the third string are diode connected transistors.

14. The circuit of claim 13 wherein the base of said output transistor is connected to the junction of said first current source and said second string.

15. The circuit of claim 14 further comprising a third current source connected to said third string, said third current source providing a current substantially equal to the current flowing in the output transistor, said third current source and said fourth string being connected in parallel with one another.

16. The circuit of claim 15, wherein the number of transistor in the second string is equal to the number of transistors in the third and fourth strings, less the number of transistors in the first string.

* * * * *

UNITED STATES PATENT AND TRADEMARK OFFICE

CERTIFICATE OF CORRECTION

PATENT NO. : 5,391,947

DATED : 2/21/95

INVENTOR(S) : J. O. Groves, Jr., et al

It is certified that error appears in the above-identified patent and that said Letters Patent is hereby corrected as shown below:

Column 8, line 4, delete "umber" and insert number;

Column 8, line 5, delete "sistor" and insert sistors;

Column 8, line 31, delete "transistor" and insert transistors.

Signed and Sealed this

Thirtieth Day of May, 1995

Attest:

Bruce Lehman

BRUCE LEHMAN

*Attesting Officer*

*Commissioner of Patents and Trademarks*